United States Patent
Lee

(10) Patent No.: US 8,264,786 B2
(45) Date of Patent: Sep. 11, 2012

(54) LENS MODULE

(75) Inventor: Hsin-Ho Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 8 days.

(21) Appl. No.: 12/777,261

(22) Filed: May 11, 2010

(65) Prior Publication Data
US 2011/0116178 A1     May 19, 2011

(30) Foreign Application Priority Data

Nov. 17, 2009 (CN) .......................... 2009 1 0309845

(51) Int. Cl.
*G02B 7/02* (2006.01)
(52) U.S. Cl. ........................ 359/819; 359/811
(58) Field of Classification Search .................. 359/811, 359/819, 813, 822
See application file for complete search history.

(56) References Cited

U.S. PATENT DOCUMENTS

| | | | |
|---|---|---|---|
| 6,233,403 B1 * | 5/2001 | Aratame et al. | 396/6 |
| 7,570,546 B2 * | 8/2009 | Ishii | 369/44.14 |
| 7,893,514 B2 * | 2/2011 | Kwon et al. | 257/433 |
| 7,933,079 B2 * | 4/2011 | Ning et al. | 359/811 |

\* cited by examiner

*Primary Examiner* — Joseph P Martinez
*Assistant Examiner* — Brandi Thomas
(74) *Attorney, Agent, or Firm* — Altis Law Group, Inc.

(57) ABSTRACT

A lens module includes a lens barrel, a lens and an aperture plate. The lens barrel includes a main body. The lens barrel includes a main body with an inner sidewall. The lens is received in the main body and includes an optical portion and a non-optical portion surrounded the optical portion. The aperture plate is disposed on the image-side surface of the non-optical portion of lens. The aperture plate defines a plurality of cutouts on the outer periphery thereof and thereby leaving a plurality of flanges at the outer periphery thereof. The flanges abut the inner side wall. The cutouts are coated adhesive to firmly attach the aperture plate on the image-side surface of the lens and fixed on the inner sidewall of the main body.

4 Claims, 2 Drawing Sheets

LENS MODULE

BACKGROUND

1. Technical Field

The present disclosure relates to a lens module.

2. Description of Related Art

Lens modules are key members of a camera. A typical lens module includes a lens barrel with a plurality of lenses received in the lens barrel. In order to obtain a good quality image, an aperture plate is employed and is disposed on an image-side surface of one of the plurality of lenses and held by the lens barrel. In assembly, the circular circumferential surface of the aperture needs to be coated with glue using with glue needle to glue the aperture plate into the lens barrel and onto the corresponding lens. This is difficult and time-consuming work. Also, the aperture plate is hard to position with the circular shape of the circumferential surface.

Therefore, it is desirable to provide a lens module which can overcome the above-mentioned problems.

BRIEF DESCRIPTION OF THE DRAWINGS

Many aspects of the present lens module can be better understood with reference to the accompanying drawings. The components in the drawings are not necessarily drawn to scale, the emphasis instead being placed upon clearly illustrating the principles of the present lens module. Moreover, in the drawings, like reference numerals designate corresponding parts throughout the several views, and all the views are schematic.

DETAILED DESCRIPTION

Embodiments of the present lens module will now be described in detail below and with reference to the drawings.

Figure 1:
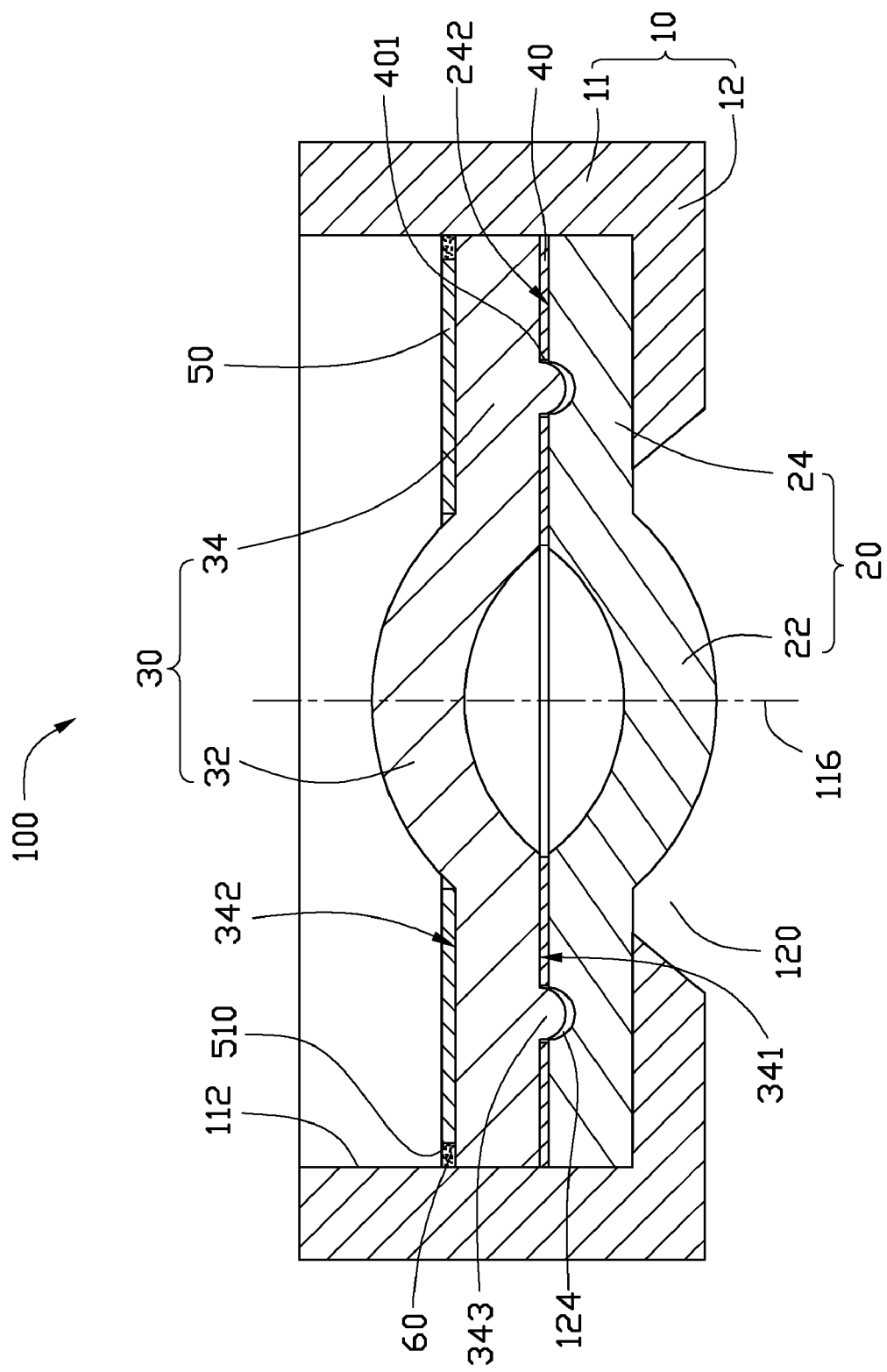
FIG. 1 is a sectional, schematic view of a lens module according to an exemplary embodiment.

Referring to FIG. 1, a lens module 100, according to an exemplary embodiment, includes a barrel 10, a first lens 20, an opaque plate 40, a second lens 30, and an aperture plate 50. The first lens 20, the opaque plate 40, the second lens 30, and the aperture plate 50 are received in the barrel 10 in the order from the object-side to the image side of the lens module 100. The lens module 100 defines an optical axis 116.

The lens barrel 10 is a hollow cylinder in shape and includes a main body 11 and an annular aperture plate 12. The annular aperture plate 12 is positioned at the object-side end of the main body 11 and is integrally formed with the main body 11. The annular aperture plate 12 defines an aperture opening 120 at the center thereof to allow light rays from objects of interest (not shown) to enter the lens barrel 10. In particular, the aperture opening 120 tapers towards the image-side of the lens barrel 10, which is beneficial for controlling the angle of incident of the light rays entering thereinto. The main body 11 includes an inner sidewall 112. The inner sidewall 112 can efficiently absorb rays of incident light to improve the image quality of the lens module 100.

The first lens 20 can be made of plastic or glass and is held and fixed by the inner sidewall of the annular aperture plate 12 by adhesive, welding (e.g., plastic welding), or other adhering methods. In the embodiment, the first lens 20 is made of plastic and fixed by the inner sidewall of the annular aperture plate 12 by adhesive. The first lens 20 includes an optical portion 22 and a non-optical portion 24. The optical portion 22 is convex toward the aperture opening 120, and is configured for refracting light rays from an object and passing therethrough as desired. The non-optical portion 24 surrounds the image portion 22, and is configured for grasping the inner sidewall 112 of the lens barrel 10. The image-side surface 242 of the non-optical portion 24 of the first lens 20 defines a plurality of recesses 124. In the embodiment, the plurality of the recesses 124 is two, the two recesses 124 are generally formed at the center of the image-side surface 242 of the non-optical portion 24. In particular, the two recesses 124 are substantially symmetrical about the imaging axis 116. The two recesses 124 are hemispherical-shaped. In an alternative embodiment, the two recesses 124 can be also prism-shaped, or pyramidal-shaped.

The second lens 30 also can be made of plastic or glass, and includes an optical portion 32 and a non-optical portion 34. The optical portion 32 is concave away from the first lens 20, and can be spherical or aspherical. In the embodiment, the second lens 30 is made of plastic and the optical portion 32 is spherical. Two extending portions 343 extend upward from the object-side surface 341 of the non-optical portion 34, corresponding to the two recesses 124. Each extending portion 343 is shaped to fit into the corresponding recesse 124. Upon assembly, the extending portions 343 are received in the corresponding recesses 124 to firmly attach the second lens 30 onto the image-side surface 242 of the non-optical portion 24 of the first lens 20. The optical portion 32 is configured for refracting light rays from the first lens 20 and is cooperated with the image portion 22 of the first lens 20 to form images of the object.

It is noteworthy that the recesses 124 of the first lens 20 and the extending portions 343 of the second lens 30 improve the positioning accuracy between the first lens 20 and the second lens 30. As a result, the optical axes of the first lens 20 and the second lens 30 are aligned for forming the optical axis 116 of the lens module 100 to improve performance of the lens module 100.

The opaque plate 40 defines two through holes 401 corresponding to the extending portions 343 of the second lens 30 to allow the two extending portions 343 to pass therethrough. The opaque plate 40 is sandwiched between the first lens 20 and second lens 30 for blocking light rays passing through the non-optical portions 24 and 34 of the first lens 20 and second lens 30, thereby improving the image quality of the lens module 100.

Figure 2:
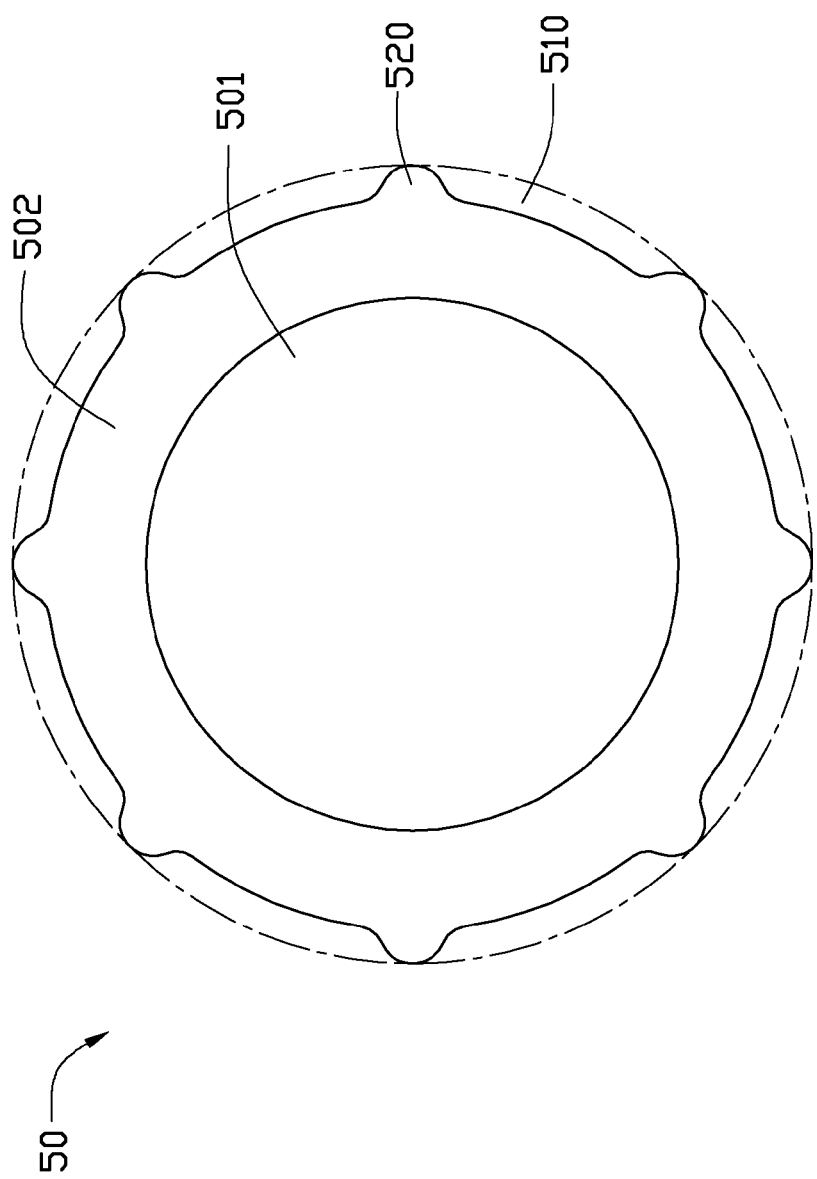
FIG. 2 is an isometric view of an aperture plate of the lens module of FIG. 1.

Also referring to FIG. 2, the aperture plate 50 is ring-shaped and is made of an opaque material, such as polyethylene terephthalate (PET) or poly carbonate (PC), to block light rays transmitted in the lens barrel 10. In the embodiment, the aperture plate 50 is made of PET. The aperture plate 50 includes a circular opening 501 and a lightproof area 502 surrounded the circular opening 501. The aperture plate 50 defines a plurality of cutouts 510 on the outer periphery thereof, thereby leaving a plurality of semicircular flanges 520 at the outer periphery thereof. The flanges 520 are equidistantly arranged around the outer periphery of the aperture plate 50.

The aperture plate 50 is arranged on the image-side surface 342 of the non-optical portion 34 of the second lens 30 with the flanges 520 abutting with the inner sidewall 112 of the main body 11. A plurality of gaps (not shown) are formed between the inner sidewall 112 of the main body 11 and the cutouts 510 of the aperture plate 50. The gaps are coated by an adhesive 60 to firmly attach the aperture plate 50 on the image-side surface of the non-optical portion 34 of the second lens 30 and the inner sidewall 112 of the main body 11. The flanges 50 abutting with the inner sidewall 112 of the main body 11 can improve assembly accuracy. In the embodiment, the adhesive 60 is black and blocks light rays from passing through the non-optical portion 22 of the first lens 20 and non-optical portion 32 of the second lens 30, improving image quality of the first lens 20 and the second lens 30.

It is also noteworthy that, in an alternative embodiment, the lens module 100 may include only a first lens 20 and omit the second lens 30. The opaque plate 40, the aperture plate 50 is firmly attached on the image-side surface of the non-optical portion 24 of the first lens 20 and the inner sidewall 112 of the main body 11.

Unlike a conventional lens module, the aperture of the lens module 100 of the present embodiment defines a plurality of cutouts, a plurality of gaps are formed between the inner sidewall 112 of the main body 11 and the cutouts 510 of the aperture plate 50. When adding the adhesive, the glue needle can glue the adhesive into the gaps without contacting with the lightproof area 502 of the aperture plate 50 to prevent the aperture plate from dislodging from the lens barrel 10.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A lens module comprising:
a lens barrel comprising a main body with an inner sidewall;
a lens received in the main body and comprising an optical portion and a non-optical portion surrounding the optical portion;
an aperture plate disposed on the image-side surface of the non-optical portion of the lens, the aperture plate defining a plurality of cutouts in an outer periphery thereof, the outer periphery abutting the inner sidewall of the main body, the cutouts opposite to the inner sidewall of the main body;
an adhesive applied in the cutouts to firmly attach the aperture plate on the image-side surface of the non-optical portion of the lens and fixed on the inner sidewall of the main body;
wherein the lens barrel comprises an annular aperture plate positioned at the object-side end of the main body, the annular aperture plate defines an aperture opening generally at the center thereof, the aperture opening tapers towards the image-side of the lens barrel.

2. A lens module, comprising:
a lens barrel comprising a main body and an annular aperture plate positioned at the object-side end of the main body, the main body comprising an inner sidewall;
a first lens mounted on the inner sidewall of the main body, and comprising an optical portion and a non-optical portion surrounding the optical portion;
a second lens mounted on an image-side surface of the first lens and comprising an optical portion and a non-optical portion surrounding the optical portion;
an opaque plate sandwiched between the first lens and the second lens;
an aperture plate disposed on the image-side surface of the non-optical portion of the second lens, the aperture plate defining a plurality of cutouts in an outer periphery thereof, the outer periphery abutting the inner-sidewall of the main body, the cutouts opposite to the inner sidewall of the main body; and
an adhesive applied in the cutouts to firmly attach the aperture plate on the image-side surface of the non-optical portion of the second lens and fixed on the inner sidewall of the main body;
wherein the image-side surface of the non-optical portion of the first lens defines two recesses, two second locating portions extend from the object-side surface of the non-optical portion of the second lens engaged in the respective recess.

3. The lens module of claim 2, wherein the opaque plate defines a plurality of through holes spatially corresponding to the extending portions of the second lens.

4. The lens module of claim 2, wherein the two recesses are substantially symmetrical about an optical axis of the lens module.

* * * * *